United States Patent
Kim et al.

(10) Patent No.: US 10,480,090 B2
(45) Date of Patent: Nov. 19, 2019

(54) ELECTROLYTIC COPPER FOIL, CURRENT COLLECTOR COMPRISING THE SAME, ELECTRODE COMPRISING THE SAME, SECONDARY BATTERY COMPRISING THE SAME, AND METHOD FOR MANUFACTURING THE SAME

(71) Applicant: LS Mtron Ltd., Anyang-si, Gyeonggi-do (KR)

(72) Inventors: Dae Young Kim, Yongin-si (KR); Seung Min Kim, Osan-si (KR)

(73) Assignee: KCF TECHNOLOGIES CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/307,069

(22) PCT Filed: Apr. 28, 2016

(86) PCT No.: PCT/KR2016/004449
§ 371 (c)(1),
(2) Date: Oct. 27, 2016

(87) PCT Pub. No.: WO2016/208863
PCT Pub. Date: Dec. 29, 2016

(65) Prior Publication Data
US 2018/0119301 A1    May 3, 2018

(30) Foreign Application Priority Data

Jun. 24, 2015 (KR) .......................... 10-2015-0090000

(51) Int. Cl.
*H01M 4/66* (2006.01)
*C25D 1/04* (2006.01)
*H01M 10/052* (2010.01)

(52) U.S. Cl.
CPC ................ *C25D 1/04* (2013.01); *H01M 4/66* (2013.01); *H01M 4/661* (2013.01); *H01M 4/665* (2013.01);
(Continued)

(58) Field of Classification Search
CPC .......... C25D 1/04; H01M 4/66; H01M 4/661; H01M 4/665; H01M 10/052; Y02P 70/54; Y02E 60/122; Y02T 10/7011
See application file for complete search history.

(56) References Cited

U.S. PATENT DOCUMENTS

| 5,431,803 A | 7/1995 | DiFranco et al. |
| 2001/0051282 A1* | 12/2001 | Yates .................. C25D 1/04 428/607 |

(Continued)

FOREIGN PATENT DOCUMENTS

| CN | 1480563 A | 3/2004 |
| CN | 104846407 A | 8/2015 |

(Continued)

OTHER PUBLICATIONS

Japanese Office Action for related Japanese Application No. 2017-561829; action dated Dec. 11, 2018; (3 pages).

(Continued)

*Primary Examiner* — Alexander Usyatinsky
(74) *Attorney, Agent, or Firm* — K&L Gates LLP

(57) ABSTRACT

An electrolytic copper foil, a current collector including the same, an electrode including the same, a secondary battery including the same and a method for manufacturing the same which can secure secondary batteries with high capacity maintenance. The electrolytic copper foil includes a first surface and a second surface opposite to the first surface, wherein each of the first and second surfaces has a peak count roughness $R_{pc}$ of 10 to 100.

11 Claims, 1 Drawing Sheet

(52) U.S. Cl.
CPC ......... *H01M 10/052* (2013.01); *Y02E 60/122* (2013.01); *Y02P 70/54* (2015.11); *Y02T 10/7011* (2013.01)

(56) References Cited

U.S. PATENT DOCUMENTS

| | | | | |
|---|---|---|---|---|
| 2003/0129497 | A1* | 7/2003 | Yamamoto | H01M 4/131 429/246 |
| 2004/0029006 | A1* | 2/2004 | Otsuka | C25D 1/04 429/220 |
| 2013/0108922 | A1* | 5/2013 | Shinozaki | H01M 4/13 429/211 |
| 2014/0193660 | A1* | 7/2014 | Tsai | C25D 1/04 428/606 |
| 2015/0340639 | A1 | 11/2015 | Matsuura | |
| 2016/0260981 | A1 | 9/2016 | Lee et al. | |

FOREIGN PATENT DOCUMENTS

| | | | |
|---|---|---|---|
| EP | 1876266 | A1 | 1/2008 |
| EP | 2660359 | A1 | 11/2013 |
| EP | 3067199 | A1 | 9/2016 |
| JP | 2000-182623 | A | 6/2000 |
| JP | 20001011684 | A | 1/2001 |
| JP | 2006299320 | A | 2/2006 |
| JP | 3850155 | A | 11/2006 |
| JP | 2012022939 | A | 2/2012 |
| JP | 2012151106 | A | 8/2012 |
| JP | 2014-135175 | A | 7/2014 |
| KR | 10-2014-0090069 | A | 7/2014 |
| KR | 10-1449342 | B1 | 10/2014 |
| WO | 2007105635 | A1 | 7/2009 |
| WO | 2011129633 | A2 | 10/2011 |
| WO | 2014033917 | A1 | 3/2014 |

OTHER PUBLICATIONS

Search Report for International Application No. PCT/KR2016/004449.
Chinese Office Action for related Chinese Application No. 201680000680.4; action dated Aug. 1, 2018; (8 pages).
European Search Report for related European Application No. 16814576.1; report dated Oct. 17, 2018; (9 pages).

* cited by examiner

ELECTROLYTIC COPPER FOIL, CURRENT COLLECTOR COMPRISING THE SAME, ELECTRODE COMPRISING THE SAME, SECONDARY BATTERY COMPRISING THE SAME, AND METHOD FOR MANUFACTURING THE SAME

BACKGROUND OF THE INVENTION

1. Field of the Invention

The present invention relates to an electrolytic copper foil, a current collector including the same, an electrode including the same, a secondary battery including the same, and a method for manufacturing the same.

2. Description of Related Art

Secondary batteries are energy conversion devices which are capable of storing electrical energy in chemical form and of converting into electrical energy to generate electricity when needed. They are also called "rechargeable batteries" because they can be charged repeatedly.

Secondary batteries are more economically and environmentally advantageous than single-use primary batteries and include lead storage batteries, nickel cadmium secondary batteries, nickel hydride secondary batteries, lithium secondary batteries and the like.

Lithium secondary batteries can store greater energy relative to size and weight, as compared to other secondary batteries. Accordingly, lithium secondary batteries are preferred in the field of information communicative apparatuses which require portability and mobility as essential factors and have an extended applicability as energy storage devices for hybrid cars and electric cars.

Lithium secondary batteries are repeatedly used in each cycle including charge and discharge. When a certain device is operated with a completely charged lithium secondary battery, the lithium ion secondary battery should have a high charge/discharge capacity in order to increase an operation time of the device. Accordingly, there is a continuous demand for research to satisfy users' increasing needs for charge/discharge capacity of lithium secondary batteries.

Meanwhile, although secondary batteries have a sufficiently high charge/discharge capacity, when charge/discharge capacity of the secondary batteries is rapidly decreased (that is, when capacity maintenance is low or lifespan is short) with repeated charge/discharge cycles, users frequently need to change secondary batteries, causing users' discomfort and energy waste.

SUMMARY OF THE INVENTION

Therefore, the present invention is directed to an electrolytic copper foil, a current collector including the same, an electrode including the same, a secondary battery including the same and a method of producing the same capable of preventing these limitations and drawbacks of the related art.

An aspect of the present invention is to provide an electrolytic copper foil which is capable of securing a secondary battery with high capacity maintenance.

Another aspect of the present invention is to provide a current collector which is capable of securing a secondary battery with high capacity maintenance.

Further another aspect of the present invention is to provide an electrode which is capable of securing a secondary battery with high capacity maintenance.

Further another aspect of the present invention is to provide a secondary battery with high capacity maintenance.

Yet another aspect of the present invention is to provide a method of producing an electrolytic copper foil which is capable of securing a secondary battery with high capacity maintenance.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

In accordance with the one aspect of the present invention, there is provided an electrolytic copper foil for a secondary battery, the electrolytic copper foil comprising a first surface and a second surface opposite to the first surface, wherein each of the first and second surfaces has a peak count roughness $R_{pc}$ of 10 to 100, wherein the peak count roughness $R_{pc}$ of each of the first and second surfaces is an average of peak count roughness $R_{pc}$ values measured at randomly-selected three points, the peak count roughness $R_{pc}$ of each point is the number of effective peaks which rise above an upper criteria line of 0.5 μm per unit sampling length of 4 mm in a surface roughness profile obtained according to steel-iron test schedule (SEP 1940), and there is at least one valley deeper than a lower criteria line of −0.5 μm between adjacent ones of the effective peaks.

In accordance with another aspect of the present invention, there is provided a current collector for a secondary battery, the current collector comprising an electrolytic copper foil having a first surface and a second surface, each having a peak count roughness $R_{pc}$ of 10 to 100 and a protective layer disposed on the electrolytic copper foil, wherein the protective layer includes at least one of chromate, benzotriazole and a silane compound.

In accordance with further another aspect of the present invention, there is provided an electrode for a secondary battery, the electrode comprising a current collector having a first surface and a second surface, each having a peak count roughness $R_{pc}$ of 10 to 100, and an active material layer disposed on the current collector, wherein the active material layer includes at least one active material selected from the group consisting of: carbon; metal (Me) of Si, Ge, Sn, Li, Zn, Mg, Cd, Ce, Ni or Fe; an alloy containing the metal; an oxide of the metal ($MeO_x$); and a complex of the metal and carbon.

In accordance with further another aspect of the present invention, there is provided a secondary battery including a cathode, an anode, an electrolyte for providing an environment enabling the lithium ions to move between the cathode and the anode, and a separator for electrically insulating the cathode from the anode, wherein the anode includes a current collector a current collector having a first surface and a second surface, each having a peak count roughness $R_{pc}$ of 10 to 100, and an active material layer disposed on the current collector.

In accordance with yet another aspect of the present invention, there is provided a method of producing an electrolytic copper foil by allowing a current to flow between a cathode plate and a rotational anode drum spaced from each other in an electrolytic solution so as to electrodeposit a copper on the rotational anode drum, the method comprising heat-treating a copper wire, acid-cleaning the heat-treated copper wire, dipping the acid-cleaned copper wire in the electrolytic solution, conducting electroplating, while the copper wire is dipped in the electrolytic solution, by allowing a current to flow between the cathode plate and the rotational anode drum, and conducting continuous filtration to remove solid impurities from the electrolytic solution during the electroplating.

General description related to the present invention given above serves to illustrate or disclose the present invention and should not be construed as limiting the scope of the present invention.

Advantageous Effects

According to the present invention, long-lifespan secondary batteries which are capable of maintaining high charge/discharge capacity for a long time in spite of repetition of charge/discharge cycles can be produced. Accordingly, electronic product consumers' discomfort and energy waste resulting from frequent change of secondary batteries can be minimized.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments according to the present invention will be described in detail with reference to the annexed drawings.

Those skilled in the art will appreciate that various modifications, additions and substitutions are possible, without departing from the scope and spirit of the invention as disclosed in the accompanying claims. Accordingly, the present invention includes modifications and alterations which fall within the scope of inventions as claimed and equivalents thereto.

A lithium ion secondary battery includes a cathode, an anode, an electrolyte for providing an environment enabling the lithium ions to move between the cathode and the anode, and a separator for electrically insulating the cathode from the anode to prevent unnecessary consumption of electrons because of movement of electrons generated in one electrode to the other electrode.

Figure 1:
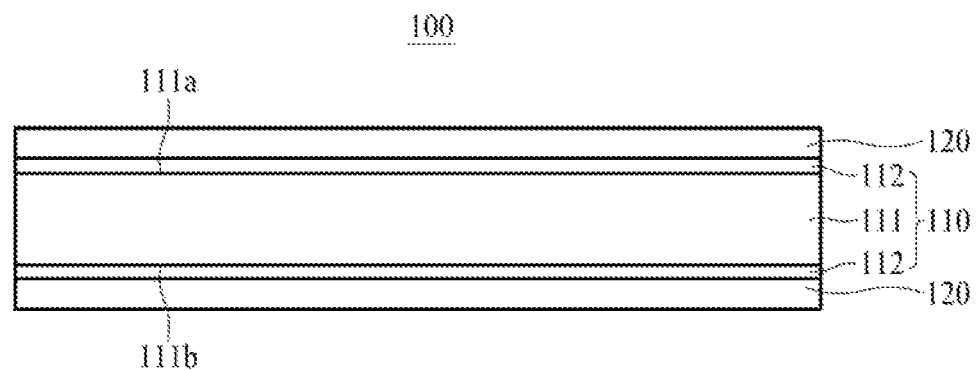
FIG. 1 is a sectional view of an electrode for a secondary battery according to an embodiment of the present invention.

FIG. 1 is a sectional view of an electrode for secondary batteries according to an embodiment of the present invention.

As shown in FIG. 1, the electrode for secondary batteries 100 according to an embodiment of the present invention includes a current collector 110 and an active material layer 120. FIG. 1 illustrates the active material layer 120 which is formed on both of the upper and lower surfaces of the current collector 110, but the present invention is not limited thereto and the active material layer 120 may be formed only on one surface of the current collector 110.

In general, in a lithium secondary battery, an aluminum foil is used as a cathode current collector coupled to a cathode active material and a copper foil is used as an anode current collector coupled to an anode active material.

According to an embodiment of the present invention, the electrode for secondary batteries 100 is an anode, the current collector 110 is an anode current collector and the active material layer 120 includes an anode active material.

The current collector 110 of the present invention which is an anode current collector, includes an electrolytic copper foil 111 having a thickness of 3 to 20 µm and a tensile strength of 30 to 60 kgf/mm². In addition, as shown in FIG. 1, the current collector 110 may further include a protective layer 112 disposed on the electrolytic copper foil 111. FIG. 1 illustrates the protective layer 112 which is formed on both of the upper and lower surfaces of electrolytic copper foil 111, but the present invention is not limited thereto and the protective layer 112 may be formed only on one surface of the electrolytic copper foil 111.

The electrolytic copper foil 111 of the present invention may be formed on a rotational anode drum by electroplating, thereby having a first surface (also called a "shiny surface") 111a which contacts the rotational anode drum in the process of electroplating and a second surface (also called a "matte surface") 111b opposite to the first surface.

In general, the shiny surface 111a has a lower roughness than the matte surface 111b, but the present invention is not limited thereto and the shiny surface 111a may have a roughness equal to or higher than the matte surface 111b. Here, roughness of the shiny surface 111a and the matte surface 111b means a ten-point mean roughness ($R_{zJIS}$)

The active material layer 120 contains, as an anode active material, at least one active material selected from the group consisting of: carbon; metal (Me) of Si, Ge, Sn, Li, Zn, Mg, Cd, Ce, Ni or Fe; an alloy containing the metal; an oxide of the metal ($MeO_x$); and a complex of the metal and carbon.

In order to increase charge/discharge capacity of secondary batteries, the active material layer 120 may be formed using a mixture of anode active materials containing a predetermined amount of Si.

Meanwhile, as a result of repealed charge/discharge of secondary batteries, the active material layer 120 alternately contracts and expands, which induces separation of the active material layer 120 from the current collector 110, causing deterioration in charge/discharge efficiency of secondary batteries. Accordingly, in order for the secondary electrodes to secure predetermined levels of capacity maintenance and lifespan (that is, in order to prevent deterioration in charge/discharge efficiency of secondary batteries), the current collector 110 should have excellent coatability to the active material so that adhesion strength between the current collector 110 and the active material layer 120 can be increased.

In a broad sense, as the ten-point mean roughness $R_{zJIS}$ of the shiny surface 111a and the matte surface 111b of the electrolytic copper foil 111 decreases, deterioration in charge/discharge efficiency of the secondary battery including the current collector 110 decreases.

Accordingly, each of the shiny surface 111a and the matte surface 111b of the electrolytic copper foil 111 according to an embodiment of the present invention has a ten-point mean roughness $R_{zJIS}$ of 2 µm or less. When the shiny surface 111a or the matte surface 111b has a ten-point mean roughness $R_{zJIS}$ exceeding 2 µm, contact uniformity between the current collector 110 and the active material layer 120 does not reach a desired level and the secondary battery thus cannot satisfy a capacity maintenance of 90% or higher required in the art.

However, the present applicant found that an electrolytic copper foil 111 the shiny surface 111a and the matte surface 111b of which have a ten-point mean roughness $R_{zJIS}$ of 2 µm or less does not always secure capacity maintenance of the secondary battery, of 90% or higher. That is, a low ten-point mean roughness $R_{zJIS}$ (for example, 2 µm or less) of the shiny surface 111a and the matte surface 111b of the electrolytic copper foil 111 cannot be a sufficient condition for capacity maintenance of the secondary battery of 90% or higher.

In particular, it was found that there is less correlation between the ten-point mean roughness $R_{zJIS}$ of the electrolytic copper foil 111 and capacity maintenance of the secondary battery when the active material layer 120 contains Si for high capacity of the secondary battery.

As a result of repeated research, the present applicant found that a peak count roughness $R_{pc}$ of the electrolytic copper foil 111 is an important factor in stably securing capacity maintenance of 90% or higher.

Figure 2:
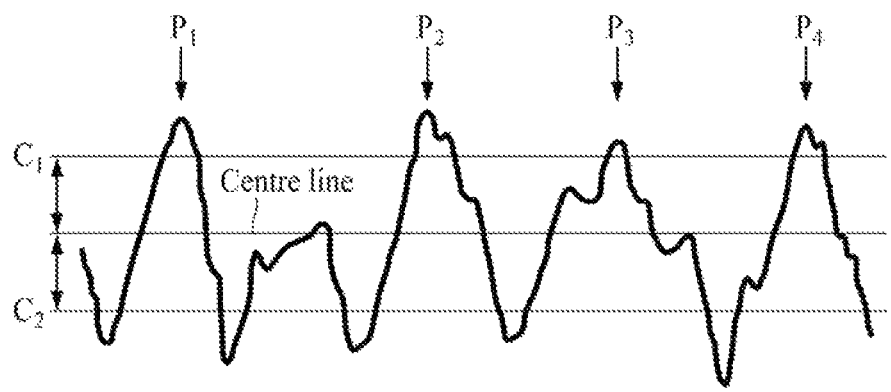
FIG. 2 illustrates a surface roughness profile obtained according to steel-iron test schedule (SEP 1940) specification.

Hereinafter, the peak count roughness $R_{pc}$ of the electrolytic copper foil 111 will be described with reference to FIG. 2.

As used herein, the peak count roughness $R_{pc}$ of each of the shiny surface 111a and the matte surface 111b of the electrolytic copper foil 111 means an average of peak count roughness $R_{pc}$ values obtained at three randomly-selected points, and the peak count roughness $R_{pc}$ of each point is the number of effective peaks $P_1$, $P_2$, $P_3$ and $P_4$ which rise above an upper criteria line C1 of 0.5 µm per unit sampling length of 4 mm in the surface roughness profile obtained according to steel-iron test schedule (SEP 1940). In this case, there is at least one valley deeper than a lower criteria line C2 of −0.5 µm between adjacent ones of the effective peaks. If there is no valley deeper than the lower criteria line C2 of −0.5 µm between adjacent peaks rising above the upper criteria line C1, all of the adjacent peaks cannot be "effective peaks" used for measurement of the peak count roughness $R_{pc}$ and relatively lower one is excluded in determining the number of "effective peaks".

According to the present invention, the shiny surface 111a and the matte surface 111b of the electrolytic copper foil 111 have a peak count roughness $R_{pc}$ of 10 to 100, respectively.

When the peak count roughness $R_{pc}$ is less than 10, capacity maintenance of the secondary battery is deteriorated. This is because the stress caused during the charge/discharge of the secondary battery is concentrated on mountains which locally protrude.

Furthermore, when the peak count roughness $R_{pc}$ exceeds 100, capacity maintenance of the secondary battery is also deteriorated. This is because the active material cannot be uniformly coated on the electrolytic copper foil 111 due to the excessive number of mountains.

The difference in peak count roughness $R_{pc}$ between the shiny surface 111a and the matte surface 111b of the electrolytic copper foil 111 is preferably 60 or less because, according to an embodiment of the present invention, both surfaces of the current collector 110 are coated with the active material. When the difference in the peak count roughness $R_{pc}$ exceeds 60, capacity maintenance of the secondary battery is deteriorated due to difference in surface appearance between both surfaces 111a and 111b.

As described above, the current collector 110 for secondary batteries of the present invention may further include a protective layer 112 on the electrolytic copper foil 111. The protective layer 112 may be formed by anticorrosion treatment of the electrolytic copper foil 111. That is, the electrolytic copper foil 111 of the present invention may be used as the current collector, but is preferably subjected to anticorrosion treatment using chromate, benzotriazole and/or a silane compound. The anticorrosion treatment prevents corrosion of the electrolytic copper foil 111, improves heat resistance and enhances adhesive strength to the active material layer 120, thus inhibiting deterioration in charge/discharge efficiency of secondary batteries.

Hereinafter, a method of producing an electrolytic copper foil according to an embodiment of the present invention will be described in detail.

A deposition machine used for producing the electrolytic copper foil 111 includes an electrolytic bath containing an electrolytic solution, and a rotational anode drum and a cathode plate spaced from each other in the electrolytic solution.

The electrolytic copper foil 111 is produced by adding a small amount of organic additive such as hydroxyethyl cellulose (HEC), organic sulfide, organic nitride, and/or thiourea-based compound to an electrolytic solution containing 50 to 100 g/L of a copper ion, 50 to 150 g/L of sulfuric acid and 50 ppm or less of chlorine ions, and then depositing copper on the surface of the rotational anode drum at a current density of 10 to 80 A/dm² at 40 to 60° C.

The ten-point mean roughness $R_{zJIS}$ and the peak count roughness $R_{pc}$ of the shiny surface 111a of the electrolytic copper foil 111 depend on a polishing level of the surface of the rotational anode drum (the surface on which copper is deposited by electroplating).

According to the present invention, in order for the shiny surface 111a to have a peak count roughness $R_{pc}$ of 10 to 100 and a ten-point mean roughness $R_{zJIS}$ of 2 µm or less, the surface of the rotational anode drum is polished with a #800 to #1500 grit polishing brush.

The ten-point mean roughness $R_{zJIS}$ and the peak count roughness $R_{pc}$ of the matte surface 111b of the electrolytic copper foil 111 depend on the composition of the electrolytic solution (particularly, concentrations of organic impurities and metal impurities), used for electroplating, the current density of electroplating and the like.

According to the present invention, in order for the matte surface 111b to have a peak count roughness $R_{pc}$ of 10 to 100 and a ten-point mean roughness $R_{zJIS}$ of 2 µm or less, the concentrations of organic impurities and metal impurities in the electrolytic solution are controlled to 1 g/L or less and 10 g/L or less, respectively, and the electroplating is conducted at a current density of 10 to 80 A/dm².

In addition, according to the present invention, in order to control concentrations of organic impurities and metal impurities in the electrolytic solution controlled to 1 g/L or less and 10 g/L less, respectively, organic substances are burned by thermal treatment at a high temperature of 600 to 800° C. (for example, about 700° C.) and then cleaned with an acid before addition of a highly pure copper wire to the electrolytic solution. In addition, continuous filtration is performed to remove solid impurities including organic impurities and metal impurities from the electrolytic solution during electroplating, thereby maintaining concentrations of organic impurities and metal impurities in the electrolytic solution at 1 g/L or less and at 10 g/L or less, respectively.

Subsequently, a protective layer 112 is formed on the shiny surface 111a and/or the matte surface 111b of the electrolytic copper foil 111 by anticorrosion treatment using chromate, benzotriazole (BTA) and/or a silane compound, thereby producing the current collector 110 of the present invention.

For example, the protective layer 112 can be formed by dipping the electrolytic copper foil 111 in 1 to 10 g/L of a potassium dichromate solution at room temperature for 2 to 20 seconds.

Subsequently, the current collector 110 is coated with at least one active material selected from the group consisting of: carbon; metal (Me) of Si, Ge, Sn, Li, Zn, Mg, Cd, Ce, Ni or Fe; an alloy containing the metal (Me); oxides of the metal (Me) (MeO$_x$); and a complex of the metal (Me), to produce an electrode (that is, anode) for secondary batteries of the present invention.

For example, 100 parts by weight of carbon as an anode active material, 1 to 3 parts by weight of styrene butadiene rubber (SBR) and 1 to 3 parts by weight of carboxymethyl cellulose (CMC) are mixed and produced into a slurry using distilled water as a solvent. Subsequently, the flurry is applied to a thickness of 20 to 60 μm onto the current collector 110 using a doctor blade and pressed at 110 to 130° C. and at a pressure of 0.5 to 1.5 ton/cm².

A lithium secondary battery can be produced using the electrode (anode) for secondary batteries of the present invention produced by the method as described above, in combination with an ordinary cathode, electrolyte and separator.

Hereinafter, the present invention will be described in more detail with reference to the following examples and comparative Examples. The following examples are only given for better understanding of the present invention and should not be construed as limiting the scope of the present invention.

Production of Electrolytic Copper Foil

Examples 1 to 4 and Comparative Examples 1 to 4

Electrolytic copper foils were produced under the same conditions except that i) whether or not a copper wire was subjected to heat treatment and what the heat treatment temperature was, ii) whether or not continuous filtration is conducted during electroplating, and/or iii) the grit of polishing brush used for surface polishing of the rotational anode drum are changed as shown in the following Table 1.

Subsequently, the peak count roughness $R_{pc}$ of the shiny surface and matte surface of the electrolytic copper foils was measured using a MahrSurf M300 roughness tester available from Mahr company and results are shown in the following Table 1.

As described above, the peak count roughness $R_{pc}$ of the shiny surface 111a and the matte surface 111b of the electrolytic copper foil 111 means an average of peak count roughness $R_{pc}$ values obtained at three randomly-selected points, the peak count roughness $R_{pc}$ of each point is the number of effective peaks which rise above an upper criteria line C1 of 0.5 μm per unit sampling length of 4 mm in the surface roughness profile obtained according to the steel-iron test schedule (SEP 1940).

If there is no valley deeper than a lower criteria line C2 of −0.5 μm between adjacent peaks rising above the upper criteria line C1, relatively lower one is excluded in determining the number of "effective peaks".

TABLE 1

|  | Heat treatment temperature of copper wire (° C.) | Whether continuous filtration is conducted | Grit of polishing brush (#) | $R_{pc}$ of matte surface (count) | $R_{pc}$ of shiny surface (count) | Difference in $R_{pc}$ (count) |
|---|---|---|---|---|---|---|
| Ex. 1 | 720 | o | 1200 | 13 | 42 | 29 |
| Ex. 2 | 700 | o | 1400 | 20 | 24 | 4 |
| Ex. 3 | 680 | o | 800 | 39 | 98 | 59 |
| Ex. 4 | 660 | o | 1000 | 98 | 89 | 9 |
| Comp. Ex. 1 | 810 | o | 1600 | 8 | 9 | 1 |
| Comp. Ex. 2 | — | o | 700 | 112 | 128 | 16 |
| Comp. Ex. 3 | — | x | 1200 | 181 | 47 | 134 |
| Comp. Ex. 4 | 670 | o | 600 | 47 | 139 | 92 |

Production of Secondary Battery

Examples 5 to 8 and Comparative Examples 5 to 8

The electrolytic copper foils of Examples 1 to 4 and Comparative Examples 1 to 4 were dipped in 10 g/L of a potassium dichromate solution for 10 seconds to obtain current collectors including a protective layer formed on an electrolytic copper foil. Subsequently, 100 parts by weight of commercially available carbon as an anode active material was mixed with 2 parts by weight of SBR and 2 parts by weight of CMC, and a slurry was produced using distilled water as a solvent. The slurry was applied to a thickness of 50 μm on the current collectors having a width 10 cm using a doctor blade, dried at 120° C. and pressed at a pressure of 1 ton/cm² to produce 8 anodes for secondary batteries.

8 secondary batteries were produced using the anodes for secondary batteries thus produced in combination with an electrolytic solution and a cathode for secondary batteries. The electrolytic solution and the cathode were prepared as follows.

LiPF$_6$ as a solute was dissolved in a non-aqueous organic solvent containing a mixture of ethylene carbonate (EC) and ethylene methyl carbonate (EMC) in a ratio of 1:2 to prepare a 1M basic electrolytic solution, and 99.5% by weight of the basic electrolytic solution was mixed with 0.5% by weight of succinic anhydride, to prepare the electrolytic solution.

In addition, lithium manganese oxide ($Li_{1.1}Mn_{1.85}Al_{0.05}O_4$) was mixed with an orthorhombic crystal structure of lithium manganese oxide (o-$LiMnO_2$) in a weight ratio of 90:10 to produce a cathode active material. The cathode active material, carbon black and polyvinylidene fluoride (PVDF) as a binder were mixed in a weight ratio of 85:10:5 and was further mixed with NMP as an organic solvent to prepare a slurry. The slurry was applied onto opposite surfaces of an aluminum foil with a thickness of 20 μm, followed by drying to produce the cathode.

Capacity maintenance was measured for 8 secondary batteries of Examples 5 to 8 and Comparative Example 5 to 8 thus produced according to the following method and results are shown in Table 2.

Discharge Capacity Maintenance of Secondary Battery

A capacity per weight (g) of the cathode was measured at a charge operating voltage of 4.3V and a discharge operating voltage of 3.4V, charge/discharge test was conducted 50 cycles at 50° C. and at a charge/discharge rate of 0.2 C to evaluate high temperature lifespan, and discharge capacity maintenance was calculated in accordance with the following Equation 1:

Discharge capacity maintenance (%)=($50^{th}$ discharge capacity/$1^{st}$ discharge capacity)×100     Equation 1

For reference, the discharge capacity maintenance of secondary batteries required in the art is 90% or higher.

TABLE 2

| | $R_{pc}$ of matte surface of electrolytic copper foil (count) | $R_{pc}$ of shiny surface of electrolytic copper foil (count) | Difference in $R_{pc}$ between two surfaces of electrolytic copper foil (count) | Discharge capacity maintenance of secondary battery (%) |
|---|---|---|---|---|
| Ex. 5 | 13 | 42 | 29 | 95 |
| Ex. 6 | 20 | 24 | 4 | 97 |
| Ex. 7 | 39 | 98 | 59 | 93 |
| Ex. 8 | 98 | 89 | 9 | 94 |
| Comp. Ex. 5 | 8 | 9 | 1 | 84 |
| Comp. Ex. 6 | 112 | 128 | 16 | 85 |
| Comp. Ex. 7 | 181 | 47 | 134 | 85 |
| Comp. Ex. 8 | 47 | 139 | 92 | 87 |

From Table 2, it can be seen that, when at least one of the shiny surface and the matte surface of the electrolytic copper foil has a peak count roughness $R_{pc}$ exceeding 100 (count), discharge capacity maintenance of the secondary battery produced using such electrolytic copper foil cannot satisfy 90% or higher required in the art (Comparative Examples 6-8). This is considered because the active material is not uniformly coated on the electrolytic copper foil due to excessively many mountains.

In addition, it can be seen that, when at least one of the shiny surface and the matte surface of the electrolytic copper foil has a peak count roughness $R_{pc}$ less than 100 (count), discharge capacity maintenance of the secondary battery produced using such electrolytic copper foil cannot satisfy 90% or higher required in the art (Comparative Example 5). This is considered because stress is concentrated on mountains which locally protrude upon charge/discharge of the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrolytic copper foil for a secondary battery, the electrolytic copper foil comprising:
   a first surface; and
   a second surface opposite to the first surface,
   wherein each of the first and second surfaces has a peak count roughness Rpc of 10 to 100,
   wherein the peak count roughness Rpc of each of the first and second surfaces is an average of peak count roughness Rpc values measured at randomly-selected three points,
   the peak count roughness Rpc of each point is the number of effective peaks which rise above an upper criteria line of 0.5 μm per unit sampling length of 4 mm in a surface roughness profile obtained according to steel-iron test schedule (SEP 1940), and
   there is at least one valley deeper than a lower criteria line of −0.5 μm between adjacent ones of the effective peaks.

2. The electrolytic copper foil according to claim 1, wherein a difference in peak count roughness Rpc between the first and second surfaces is 60 or less.

3. The electrolytic copper foil according to claim 1, wherein each of the first and second surfaces has a ten-point mean roughness $R_{zJIS}$ of 2 μm or less.

4. The electrolytic copper foil according to claim 1, wherein the electrolytic copper foil has a thickness of 3 to 20 μm and tensile strength of 30 to 60 kgf/$mm^2$.

5. A current collector for a secondary battery, the current collector comprising:
   the electrolytic copper foil according to claim 1; and
   a protective layer disposed on the electrolytic copper foil,
   wherein the protective layer comprises at least one of chromate, benzotriazole and a silane compound.

6. The current collector according to claim 5, wherein the protective layer is formed on the first and second surfaces of the electrolytic copper foil.

7. An electrode for a secondary battery, the electrode comprising:
   a current collector comprising the electrolytic copper foil according to claim 1; and
   an active material layer disposed on the current collector;
   wherein the active material layer comprises at least one active material selected from the group consisting of: carbon; a metal (Me) of Si, Ge, Sn, Li, Zn, Mg, Cd, Ce, Ni or Fe; an alloy containing the metal; an oxide of the metal ($MeO_x$); and a chemical compound of the metal and carbon.

8. The electrode according to claim 7, wherein the active material layer comprises Si.

9. The electrode according to claim 7, wherein the current collector further comprises a protective layer comprising at least one of chromate, benzotriazole and a silane compound, and
   wherein the protective layer is interposed between the electrolytic copper foil and the active material layer.

10. A secondary battery comprising:
a cathode;
an anode;
an electrolyte for providing an environment enabling lithium ions to move between the cathode and the anode; and
a separator for electrically insulating the cathode from the anode,
wherein the anode comprises:
   a current collector comprising the electrolytic copper foil according to claim 1; and
   an active material layer disposed on the current collector.

11. The secondary battery according to claim 10, further comprising a protective layer comprising at least one of chromate, benzotriazole and a silane compound,
wherein the protective layer is interposed between the electrolytic copper foil and the active material layer.

\* \* \* \* \*